(12) United States Patent
Johnson et al.

(10) Patent No.: US 8,225,497 B2
(45) Date of Patent: Jul. 24, 2012

(54) PERMANENT MAGNET ROTOR INSTALLATION SYSTEMS

(75) Inventors: Stephen Bertram Johnson, Greenville, SC (US); Christopher Anthony Kaminski, Schenectady, NY (US); Chandrakant Bapurao Kirolikar, Brampton, CA (US); Ronald George Shillington, Peterborough, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/652,430

(22) Filed: Jan. 5, 2010

(65) Prior Publication Data

US 2011/0162199 A1   Jul. 7, 2011

(51) Int. Cl.
*H01F 13/00*   (2006.01)
*H02K 15/03*   (2006.01)
(52) U.S. Cl. ............... 29/732; 29/596; 29/598; 335/284
(58) Field of Classification Search ............... 29/596, 29/732, 598; 335/284
See application file for complete search history.

(56) References Cited

U.S. PATENT DOCUMENTS

| | | |
|---|---|---|
| 5,539,177 A | 7/1996 | Okuya et al. |
| 2005/0210663 A1 | 9/2005 | Ishida et al. |

FOREIGN PATENT DOCUMENTS

| | | | |
|---|---|---|---|
| DE | 108866 A1 | | 10/1974 |
| JP | 9084284 A | | 3/1997 |
| JP | 10014181 A | * | 1/1998 |
| JP | 20044293492 A | | 10/2004 |
| JP | 2005094970 A | * | 4/2005 |

OTHER PUBLICATIONS

Machine Translation of JP2005094970A, obtained Mar. 16, 2011.*
Machine Translation of JP10014181A, obtained Mar. 27, 2011.*
European Search Report under Section 17(6) for Application No. GB1021644.8 dated Sep. 22, 2011, 2 pages.
European Search Report under Section 17(6) for Application No. GB1021644.8 dated Sep. 16, 2011, 2 pages.

\* cited by examiner

*Primary Examiner* — Livius R Cazan
(74) *Attorney, Agent, or Firm* — Hoffman Warnick LLC; Ernest Cusick

(57) ABSTRACT

Embodiments of the invention relate generally to rotor installation systems and, more particularly, to permanent magnet rotor installation systems, including those having an in situ magnetizer or magnet insertion device. In one embodiment, the invention provides a rotor installation system comprising: at least one magnetizer for permanently magnetizing a ferromagnetic material; and an arbor for receiving a rotor having at least one portion including a ferromagnetic material, wherein the at least one magnetizer is positioned relative to the arbor to allow permanent magnetization of the ferromagnetic material.

9 Claims, 8 Drawing Sheets

PERMANENT MAGNET ROTOR INSTALLATION SYSTEMS

BACKGROUND OF THE INVENTION

Embodiments of the invention relate generally to rotor installation systems and, more particularly, to permanent magnet rotor installation systems, including those having an in situ magnetizer or magnet insertion device.

The assembly of generators, motors, and other electrical machines containing permanent magnets requires special handling systems and safety precautions as the sizes and/or strengths of the magnets increase. That is, the large permanent magnets used in such machines exhibit magnetic forces and fields of such strength that their handling is hazardous to those involved in assembling the machines. The handling systems and safety precautions such assembly requires increase its cost and complexity.

BRIEF DESCRIPTION OF THE INVENTION

In one embodiment, the invention provides a rotor installation system comprising: at least one magnetizer for permanently magnetizing a ferromagnetic material; and an arbor for receiving a rotor having at least one portion including a ferromagnetic material, wherein the at least one magnetizer is positioned relative to the arbor to allow permanent magnetization of the ferromagnetic material.

Another embodiment of the invention provides a rotor installation system comprising: an arbor for receiving a rotor; and a magnet insertion device for inserting into the rotor a plurality of permanent magnets.

Still another embodiment of the invention provides a rotor installation system comprising: an arbor; an elongate member connected to the arbor and insertable inside a tubular member; and a welding device connected to the elongate member for forming at least one welded connection within the tubular member.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
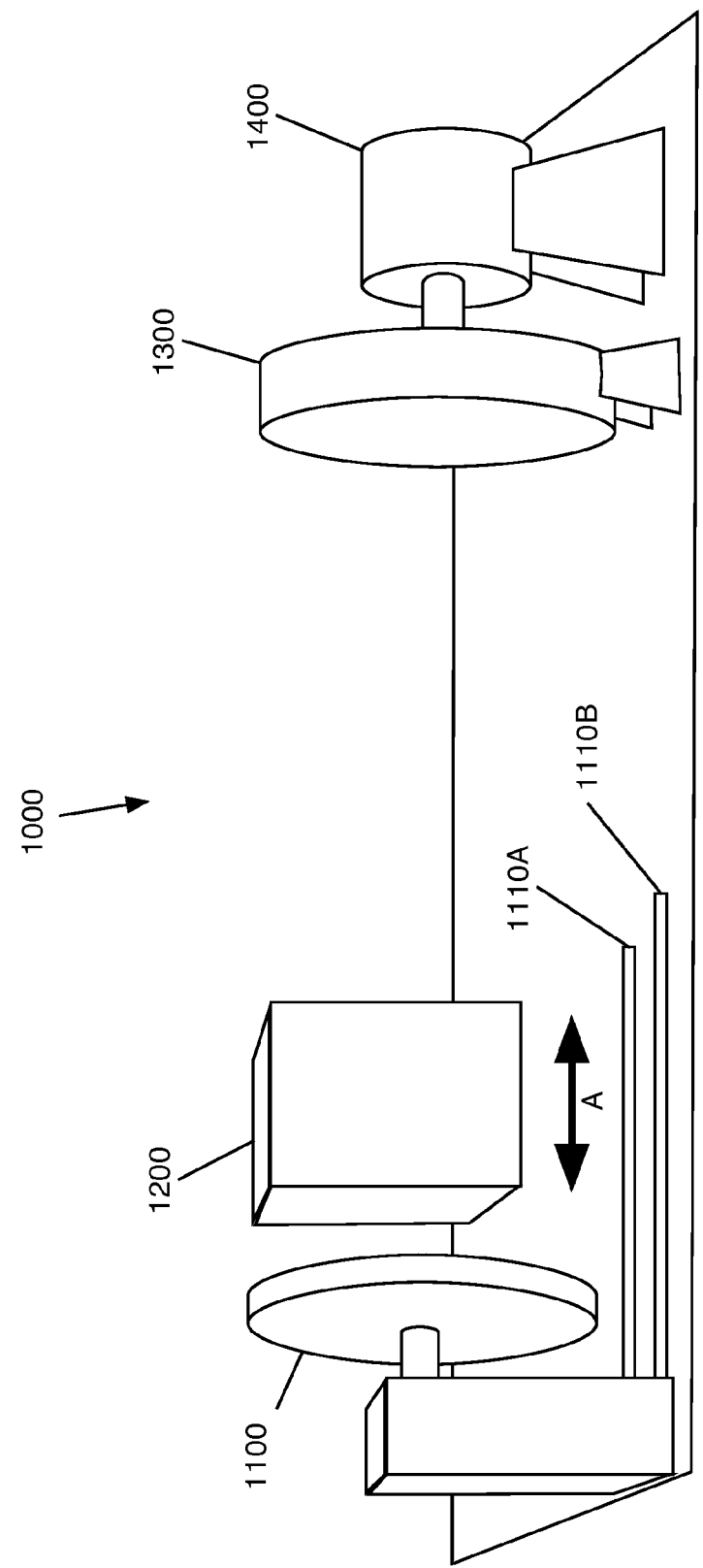
FIGS. 1-5 show a rotor installation system according to an embodiment of the invention.

FIGS. 1-5 show an illustrative operational method of magnetizing and installing a rotor using a system according to one embodiment of the invention. Referring now to FIG. 1, a rotor installation system 1000 according to one embodiment of the invention is shown. The rotor installation system 1000 includes an arbor 1100 for receiving and securing a rotor, a magnetizer 1200 for magnetizing a ferromagnetic material within such a rotor, a support 1300 for a generator, motor, or similar device having a stator and into which the rotor will be installed, and a drive motor 1400 capable of rotating the rotor within the stator once installed. To facilitate installation of the rotor, the system 1000 further comprises rails 1110A-B along which the arbor 1100 may move (i.e., along path A). Other components and/or modifications of the system 1000 will be known to one skilled in the art and are within the scope of the present invention. For example, the arbor 1100 itself or a portion thereof may be independently movable, obviating the need for the rails 1110A-B.

Figure 2:
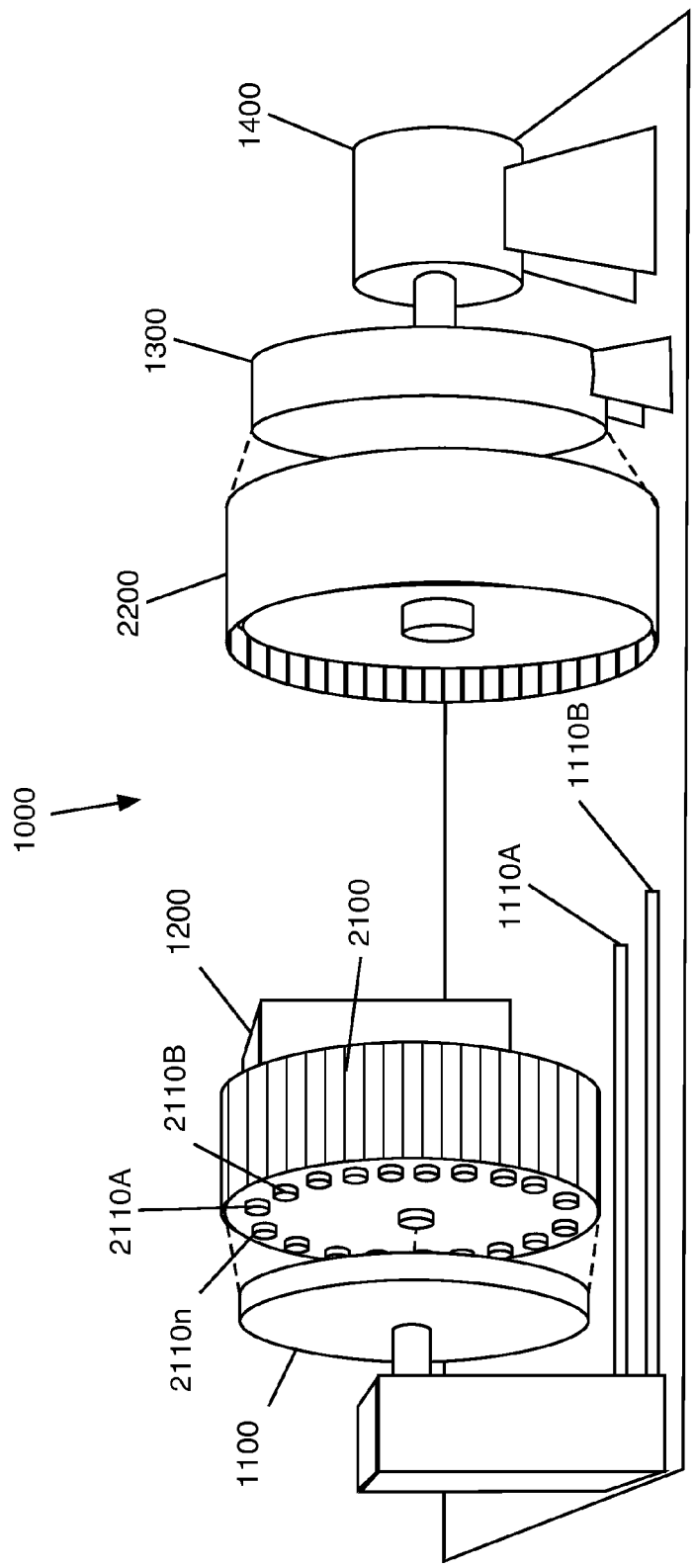

In FIG. 2, a rotor 2100 is shown being attached to the arbor 1100 and a motor 2200 having a stator being attached to the support 1300. As can be seen, the rotor 2100 includes a plurality of ferromagnetic materials 2110A, 2110B ... 2110n along its periphery. The ferromagnetic materials 2110A-n may include, for example, one or more of iron, nickel, cobalt, aluminum alloys of iron, aluminum alloys of nickel, aluminum alloys of cobalt, ceramic mixtures containing iron, ceramic mixtures containing nickel, ceramic mixtures containing cobalt, and neodymium-iron-boron alloys. These materials are provided merely for purposes of illustration and are not intended to be limiting. Other ferromagnetic materials will be known to those skilled in the art and are within the scope of the invention.

Figure 3:
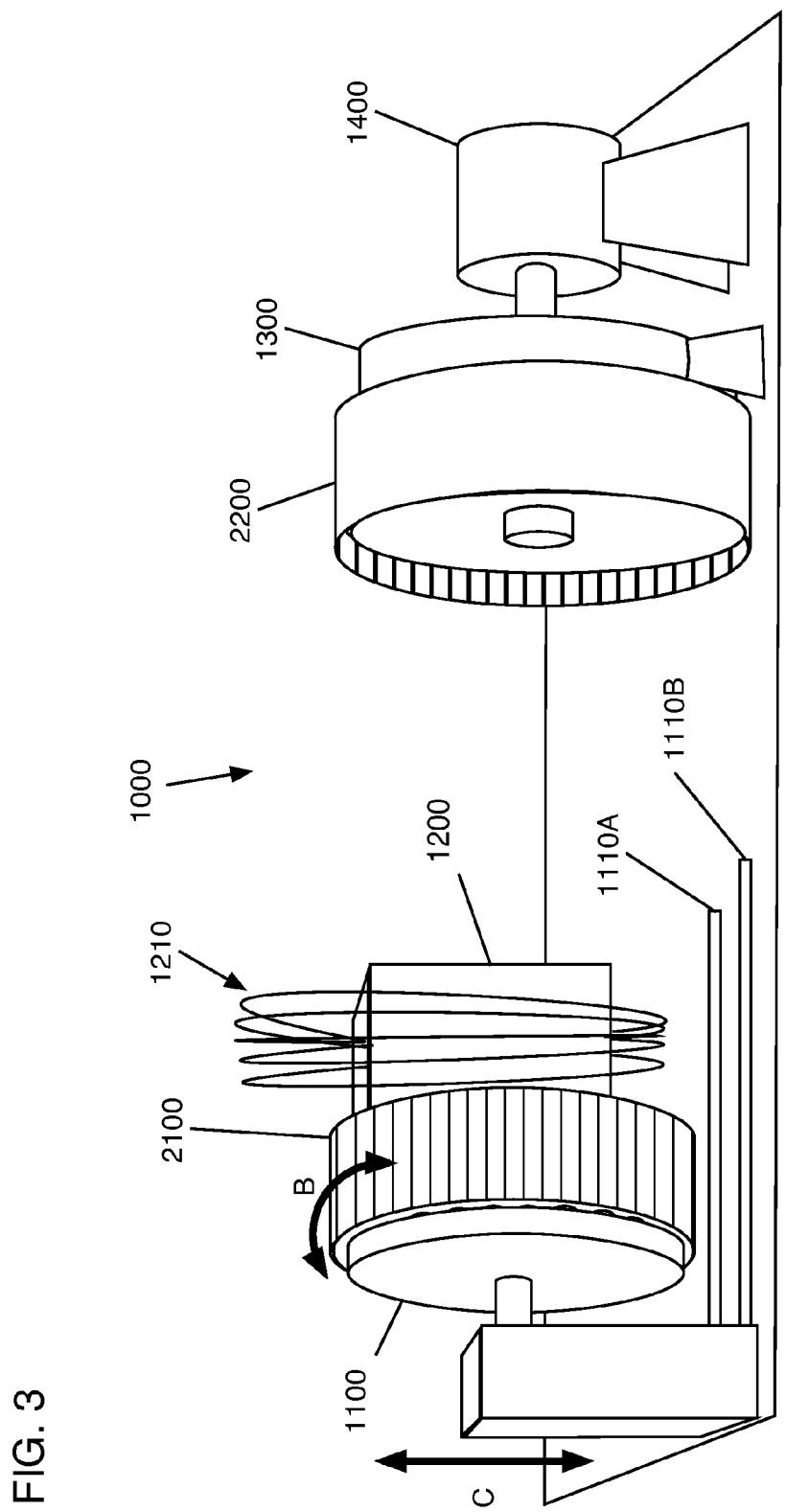

In FIG. 3, a magnetic field 1210 is produced by the magnetizer 1200, the magnetic field 1210 being of sufficient strength to impart to the ferromagnetic materials 2110A-n a degree of magnetism. For example, in the embodiment of FIG. 3, the arbor 1100 moves the rotor along path B (i.e., in a peripheral direction) to incrementally expose portions of the ferromagnetic materials 2110A-n to the magnetic field 1210. That is, the arbor 1100 rotates the rotor 2100 through the magnetic field 1210 to magnetize the ferromagnetic materials 2110A-n. In some embodiments, it may be desirable, during magnetization, for the arbor 1100 to also be movable along path C (i.e., in a substantially vertical direction) to provide concentricity of the rotor 2100. Such movement along path C may also aid in installation of the rotor 2100 into a stator of the motor 2200, as will be described below.

Figure 4:
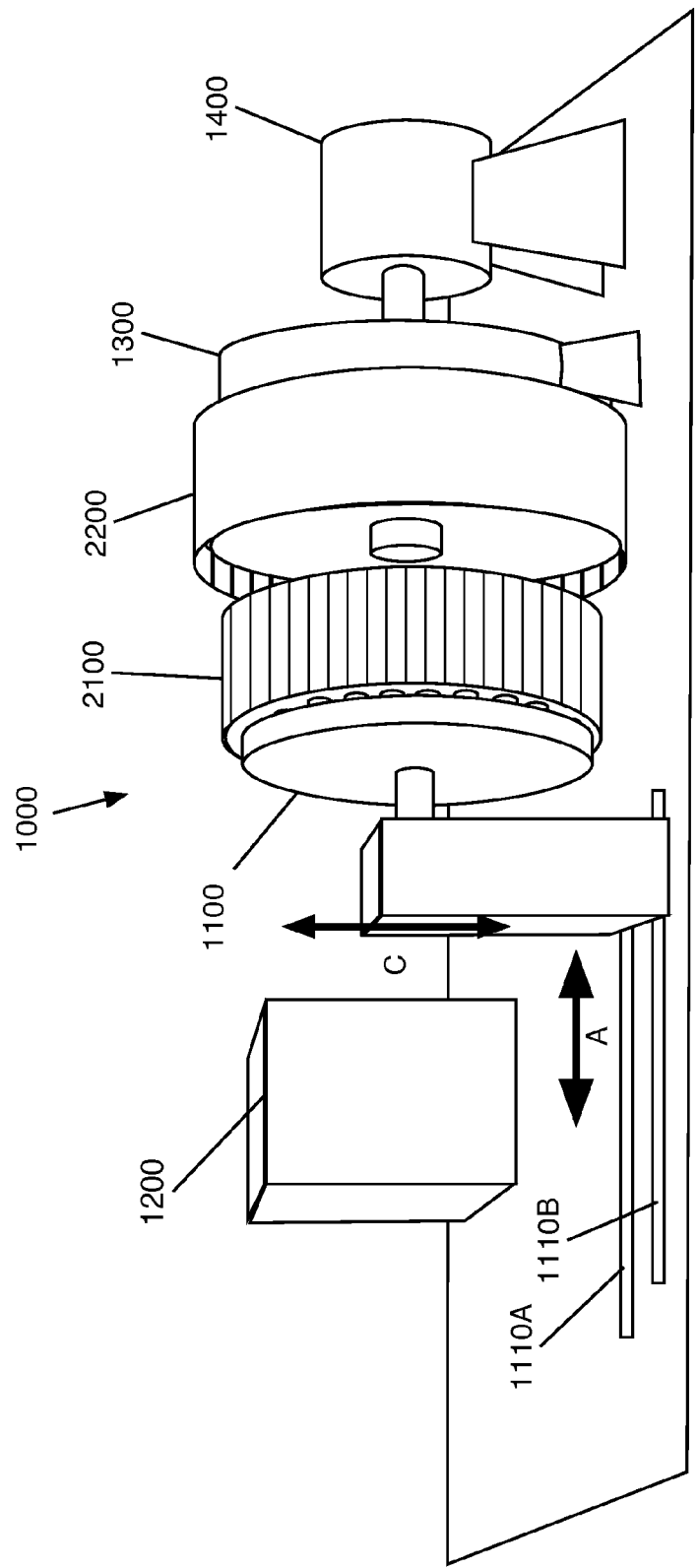

FIG. 4 shows the rotor 2100, with its ferromagnetic materials now magnetized, being installed into the stator of the motor 2200. Such installation is accomplished, in the embodiment shown here, by moving the arbor 1100 along path A (i.e., in a substantially horizontal direction) using the rails 1110A-B and, if necessary, along path C, in order to properly align the rotor 2100 and stator. Movement along either or both of paths A and C may be facilitated, for example, using hydraulic, pneumatic, electric, and/or other devices, as will be recognized by one skilled in the art. The particular mechanism(s) employed are not essential, of course, and any mechanism(s) facilitating movement along paths A and C (or any other paths described below) may be used.

Figure 5:
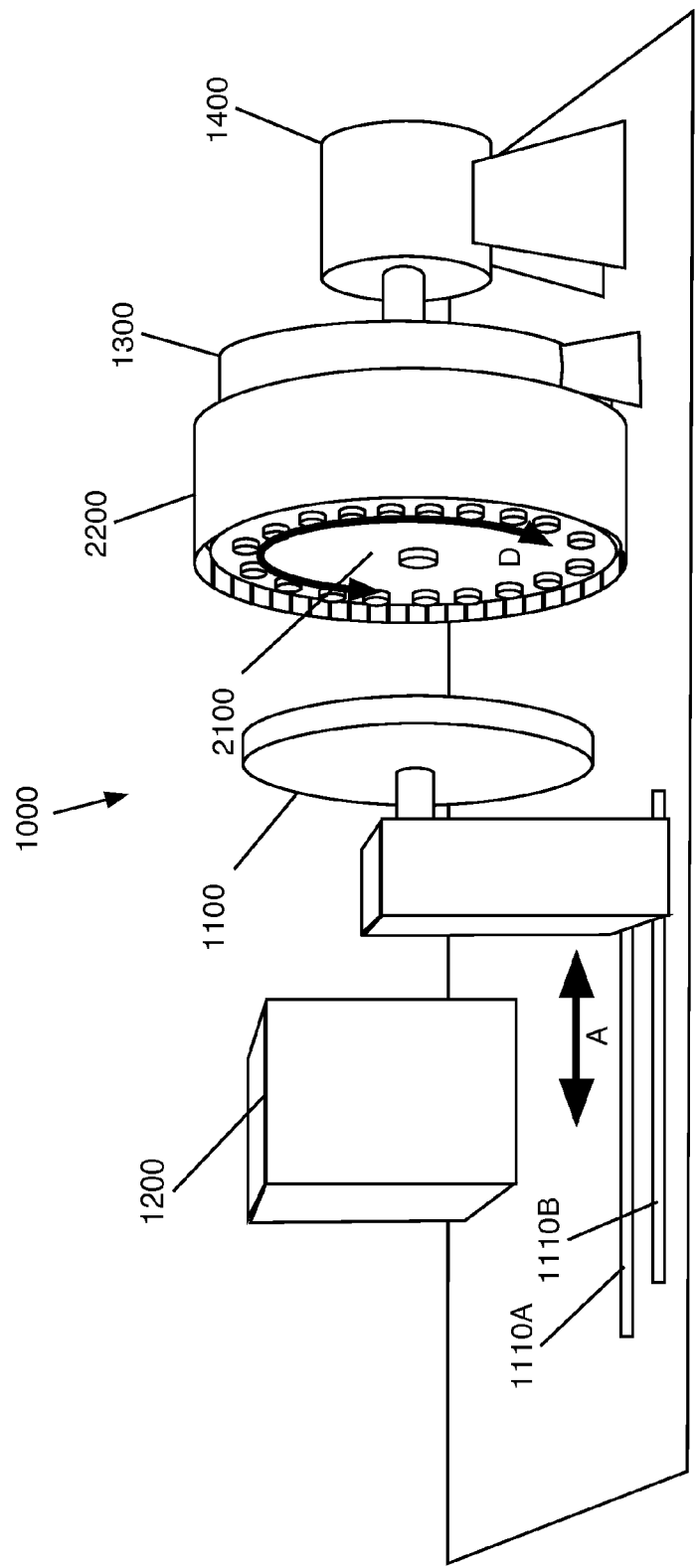

In FIG. 5, the rotor 2100 has been installed within the motor 2200. The installation may be tested using the drive motor 1400 to rotate the rotor 2100 within the stator of the motor 2200 to determine, among other things, that the rotor 2100 is properly balanced. In some embodiments, the drive motor 1400 is a variable speed motor capable of rotating the rotor 2100 from a very low speed to an operational speed.

Modifications to or variations of the system 1000 of FIGS. 1-5 may be necessary or desirable, of course, depending on the size, type, etc. of the rotor, ferromagnetic material, stator, etc. For example, rotors having a more elongate shape than that shown in FIGS. 1-5 may be more easily magnetized using a "pass-through" magnetizer that substantially surrounds all or a portion of such a rotor's periphery at various points along its axial length. Such an embodiment in shown in FIGS. 6A-B. In FIG. 6A, the rotor 2102 is again attached to the arbor 1112, which is movable along paths A and C (i.e., in substantially horizontal and vertical directions). The magnetizer 1202, however, is adapted to surround the rotor 2102 and, upon inducing a magnetic field, to magnetize the ferromagnetic materials (not shown) within the rotor 2102.

Figure 6A:
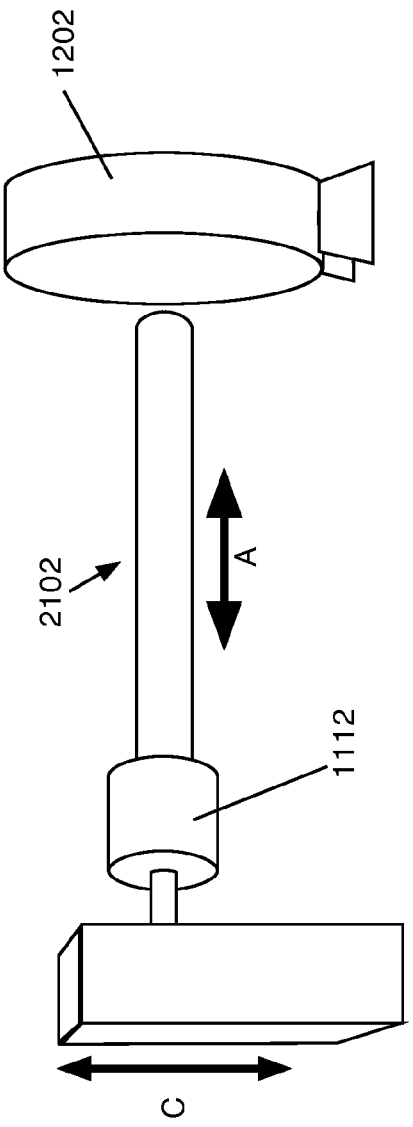
FIGS. 6A-6B show a rotor installation system according to another embodiment of the invention.
Figure 6B:
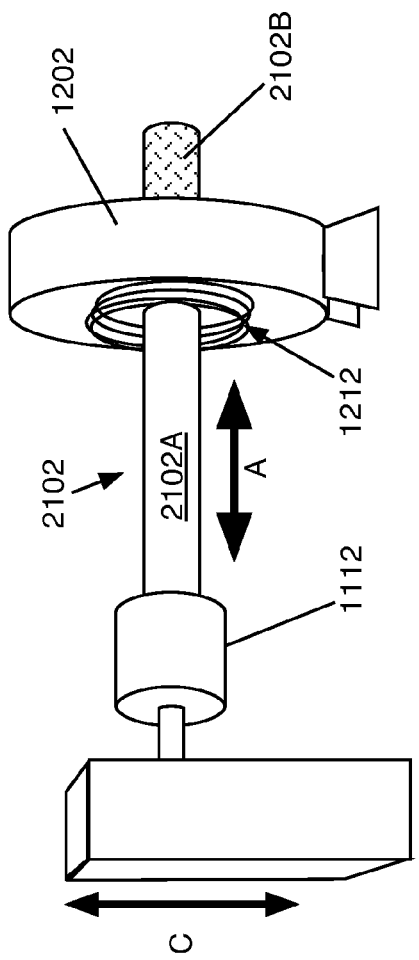

FIG. 6B shows the arbor 1112 passing the rotor 2102 through the magnetizer 1202. The magnetic field 1212 magnetizes the ferromagnetic materials, to yield a magnetized portion 2102B of the rotor 2102. An unmagnetized portion 2102A of the rotor 2102, which has yet to pass through the magnetizer 1202, is incrementally passed through the magnetizer 1202 until the ferromagnetic materials of the entire rotor 2102 are magnetized.

Embodiments having "pass-through" magnetizers, such as that shown in FIGS. 6A-B, may be useful in magnetizing rotors for high-speed electrical machines (HSEMs), which, due to their high rotational speed and attendant high centrifugal forces, often employ a retaining ring or similar device for securing the ferromagnetic materials within the rotor. Imparting a desired degree of magnetism to the ferromagnetic materials therefore often requires a strong magnetic field. The production of such a strong magnetic field, as well as its uniform application to the rotor, is more easily accomplished using a "pass-through" magnetizer, such as that shown in FIGS. 6A-B.

In another aspect, the invention provides a rotor installation system having a magnet insertion device for inserting premagnetized ferromagnetic materials into a rotor. Thus, as with the rotor installation systems described above, such a system permits magnet insertion and rotor installation without exposure of assembly personnel to the strong magnetic forces and fields produced by large permanent magnets.

Figure 7:
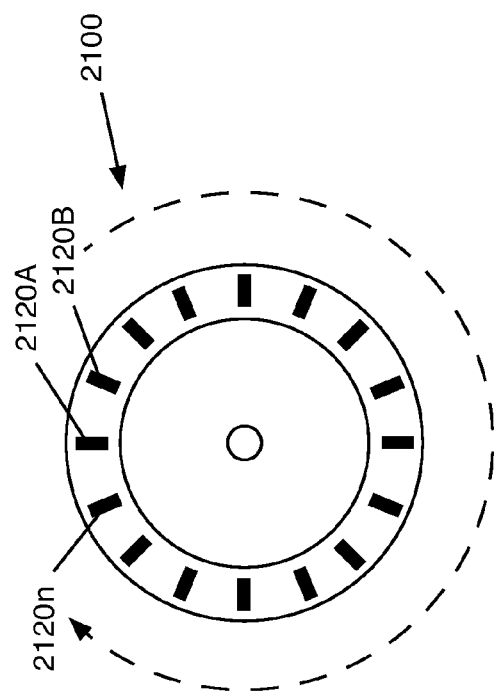
FIG. 7 shows a front view of a rotor.

For example, FIG. 7 shows a front view of a rotor 2100 having a plurality of slots 2120A, 2120B . . . 2120n spaced around its periphery. Permanent magnets are inserted into the slots 2120A-n, after which the rotor may be balanced and inserted into a stator of a generator, motor, or other electrical machine.

Figure 8:
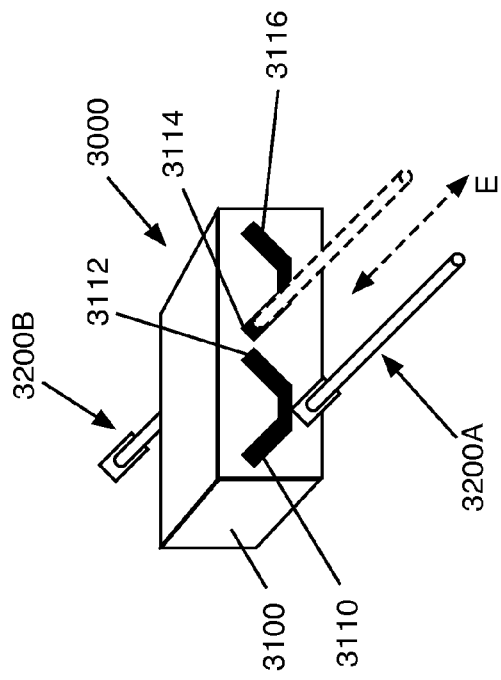
FIG. 8 shows a magnet insertion device used in another embodiment of the invention and adapted to insert one or more permanent magnets into the rotor of FIG. 7.

FIG. 8 shows a magnet insertion device 3000 according to one embodiment of the invention. The magnet insertion device 3000 includes a body 3100 in which magnets may be contained, a plurality of passages 3110, 3112, 3114, 3116, and rods 3200A-B capable of passing through a passage (e.g., 3114) to insert a magnet from within the body 3100 into a slot of the rotor. The passages 3110-3116 are shown angled with respect to the body, although this is not essential. In the illustrative embodiment shown in FIG. 8, magnet insertion is facilitated by the arbor (e.g., 1100 in FIG. 1) rotating the rotor 2100 with respect to the magnet insertion device 3000 until a rotor slot (e.g., 2120B) is aligned with a passage (e.g., 3112) of the magnet insertion device 3000. In other embodiments, the magnet insertion device 3000 may be rotated rather than, or in addition to, the rotor 2100. A rod (e.g., 3200A) then passes through the passage 3112 (i.e., along path E) to insert a magnet into the slot 2120B. The rod 3200A is then withdrawn and the arbor 1100 rotates the rotor 2100 until an empty slot (e.g., 2120A) is aligned with a passage of the magnet insertion device 3000. As noted above, hydraulic, pneumatic, electric and/or other devices and mechanisms may be employed in rotating the rotor 2100 and/or moving the rod 3200A-B along path E. Once magnets are inserted into each of the slots 2120A-n, the rotor may be balanced and inserted into a stator, as described above with respect to FIGS. 4-5.

In yet another aspect, the invention provides a rotor installation system having a welding apparatus for forming welded connections in rotors and the electrical machines into which the rotors are installed. FIGS. 9A-D show one embodiment of such a system and its application. In FIG. 9A, the rotor installation system 4000 is shown. As in the systems described above, the system 4000 includes an arbor 1114 movable along paths A, B, and C. To the arbor 1114 is connected a welding system 1500 comprising an elongate member 1510 and a welding device 1530. In some embodiments, the welding device 1530 is movable about a circumference of the elongate member 1510 (i.e., along path F). The welding device 1530 itself includes, in some embodiments, a rotary unit 1532 for moving the welding device 1530 about the circumference of the elongate member 1510 and a welding torch 1534 for forming the welded connections. Welding devices suitable for use in such an embodiment of the invention include, for example, those available from Magnatech LLC (East Granby, Conn.), including their orbital weld heads, such as the D Weld Head model 420. Use of such devices may require, for example, reorientation of the welding torch 1534 to face outward from rather than inward toward the elongate member 1510. Such devices often include the ability to include a video camera, which may be useful, in some embodiments, for inspecting the welded connections made.

Figure 9B:
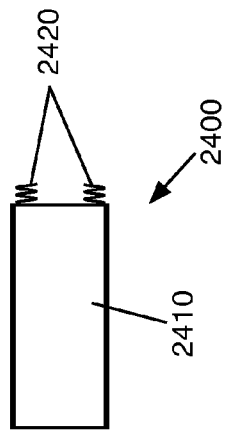
FIGS. 9A-9D show components of a rotor installation system according to yet another embodiment of the invention useful in forming welded connections between components of an electrical machine.

FIG. 9B shows a cross-sectional view of the type of rotor or electrical machine component 2400 to which the system 4000 may be applied. Here, the component 2400 comprises a tubular member 2410 and a bellows 2420. In this example, the bellows 2420 are to be secured to the tubular member 2410 via a welded connection on an interior of the tubular member. Other types of components and types of welded connections are also amenable to the system 4000 and are within the scope of the invention. The example given here is merely for purposes of illustration.

Figure 9D:
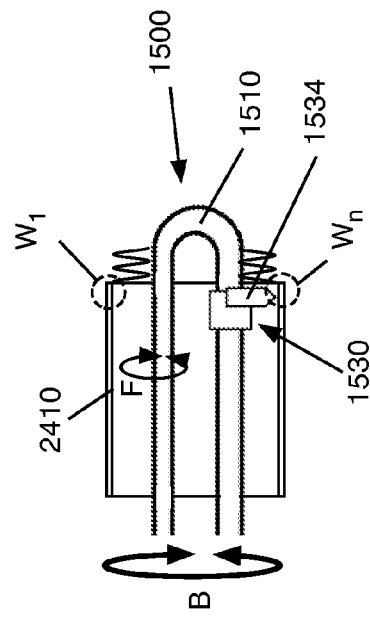
Figure 9A:
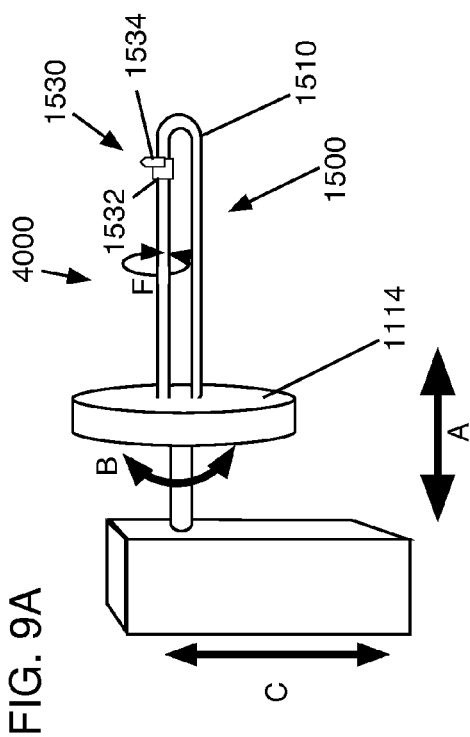
Figure 9C:
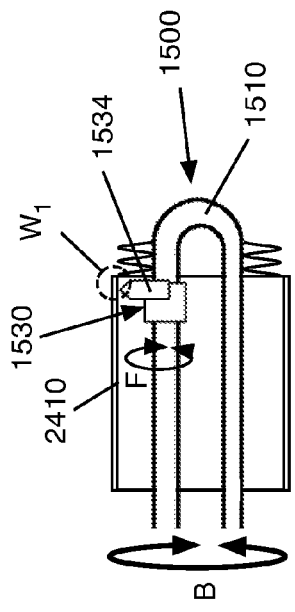

In FIG. 9C, the welding system 1500 has been inserted into the tubular member 2410 such that the welding torch 1534 is positioned to form a first weld $W_1$ on an inner surface of the tubular member 2410. The welding system 1500 and/or the welding device 1530 may then be rotated along paths B and/or F, respectively to extend the first weld $W_1$ and/or form additional welds along the inner surface of the tubular member 2410. In FIG. 9D, the welding system 1500 has been so rotated along path B to form a subsequent weld $W_n$.

The welding system 1500 described above may be used, for example, to form welded connections between components of a rotor, between components of a rotor and stator, or between any components of an electrical machine. The description above is given merely for purposes of illustration.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A rotor installation system comprising:
   at least one magnetizer for permanently magnetizing a ferromagnetic material; and
   an arbor for receiving a rotor having at least one portion including a ferromagnetic material, the arbor being movable, during the permanently magnetizing, in both a substantially horizontal direction with substantially no movement in a vertical direction and a substantially vertical direction with substantially no movement in a horizontal direction,
   wherein the at least one magnetizer is positioned relative to the arbor to allow permanent magnetization of the ferromagnetic material.

2. The rotor installation system of claim 1, further comprising:
   a support for holding a generator or motor.

3. The rotor installation system of claim 2, wherein the arbor is for installing the rotor into a stator of the generator or motor.

4. The rotor installation system of claim 3, further comprising:
   a drive motor for rotating the rotor within the stator after installation.

5. The rotor installation system of claim 1, wherein the ferromagnetic material is selected from a group consisting of: iron, nickel, cobalt, aluminum alloys of iron, aluminum alloys of nickel, aluminum alloys of cobalt, ceramic mixtures containing iron, ceramic mixtures containing nickel, ceramic mixtures containing cobalt, and neodymium-iron-boron alloys.

6. The rotor installation system of claim 1, wherein the at least one magnetizer exposes substantially all of the ferromagnetic material to a magnetic field sufficient to impart to the ferromagnetic material a degree of magnetism.

7. The rotor installation system of claim 6, wherein the at least one magnetizer substantially surrounds at least a portion of the rotor.

8. The rotor installation system of claim 1, wherein the arbor moves the rotor to incrementally expose portions of the ferromagnetic material to a magnetic field sufficient to impart to the ferromagnetic material a degree of magnetism.

9. The rotor installation system of claim 8, wherein the arbor moves the rotor in at least one of the following: a peripheral direction or an axial direction.

* * * * *